July 28, 1970    J. L. ARCHER    3,521,966
DEVICE FOR TESTING A SAMPLE WITH SOLAR RADIATION
INCLUDING MEANS TO DAMPER THE SAMPLE
Filed Feb. 14, 1968
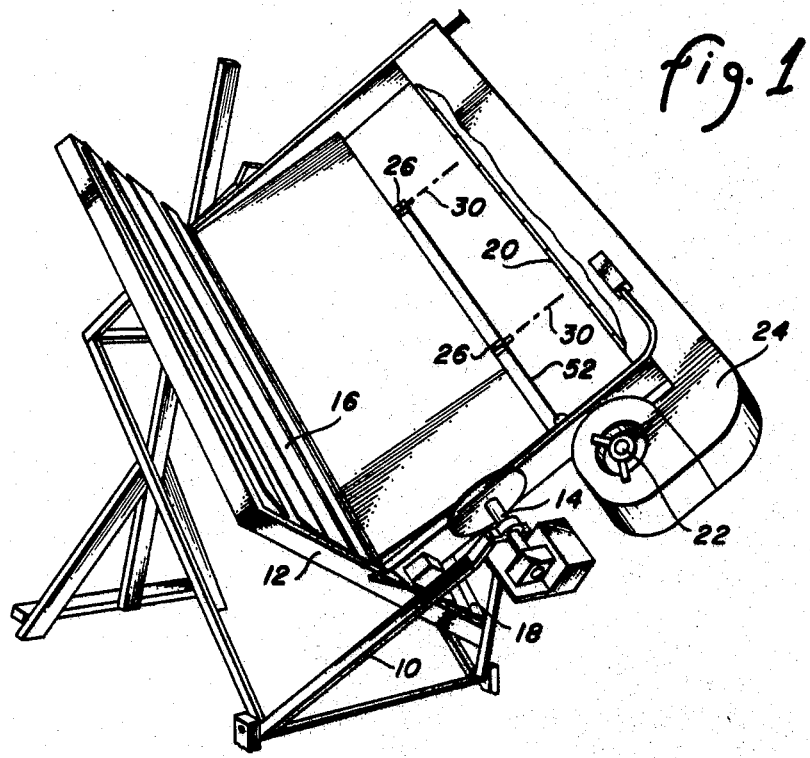
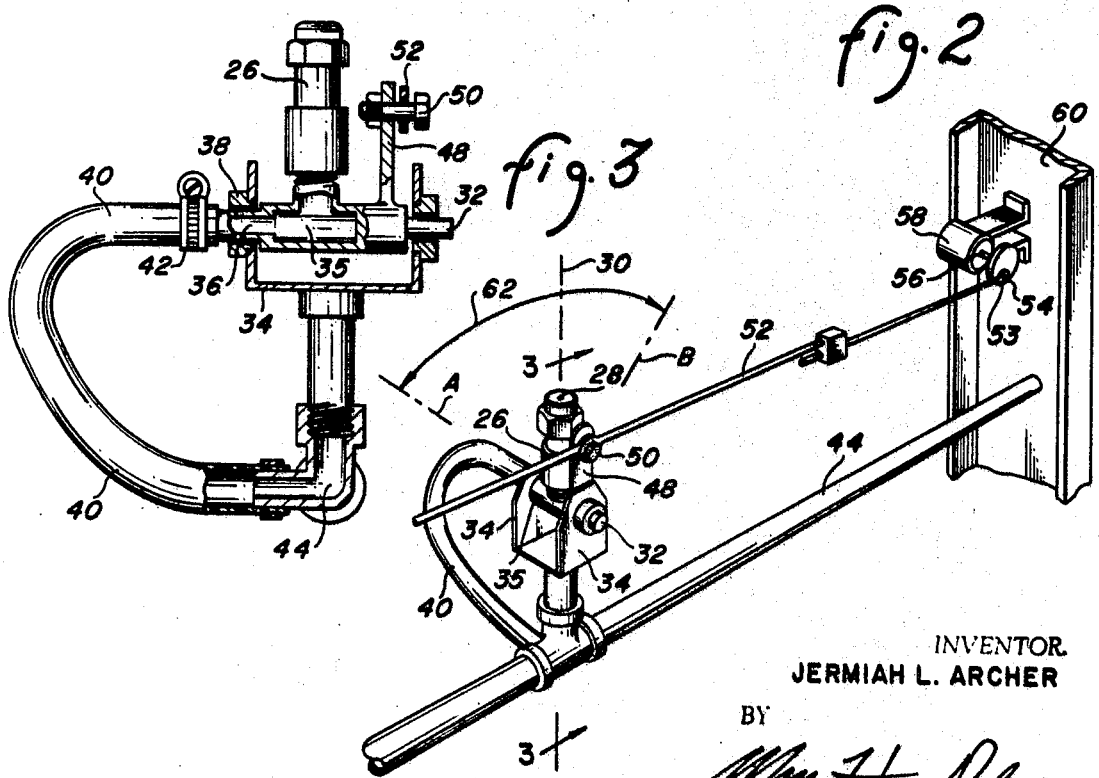
INVENTOR.
JERMIAH L. ARCHER
BY
Wm. H. Dean United States Patent Office 3,521,966
Patented July 28, 1970

3,521,966
DEVICE FOR TESTING A SAMPLE WITH SOLAR
RADIATION INCLUDING MEANS TO DAMPEN
THE SAMPLE
Jermiah L. Archer, Phoenix, Ariz., assignor to Coleman
R. Caryl, doing business as Desert Sunshine Exposure
Tests
Filed Feb. 14, 1968, Ser. No. 705,357
Int. Cl. G02b 27/32
U.S. Cl. 356—256
4 Claims

ABSTRACT OF THE DISCLOSURE

A machine for solar radiation testing of materials, including an improved means for spraying materials being tested by means of pivoted nozzles which are motorized to oscillate back and forth, and to cast water spray on samples being tested in an elongated radiation target area.

This invention relates to spray nozzle improvements for solar radiation testing machines, and more particularly, to spray nozzle improvements for solar radiation testing machines used in the testing of various materials.

BACKGROUND OF THE INVENTION

The prior art includes an apparatus and mechanism for concentrating solar rays on objects to be tested, and specifically disposed in U.S. Pat. 2,945,417, issued to C. R. Caryl et al., July 19, 1960. This apparatus of the the prior art comprises a means for concentrating the rays of the sun on articles to be tested, and also means for intermittently spraying the articles to be tested with water so as to simulate moisture conditions caused by rain and to further implement accelerated environmental testing of the various materials.

In such apparatus of the prior art, the reflecting mirrors must be kept clean in order to provide for efficient reflection of the sun rays to the target area in which the articles, under test, are located. For this reason, it has been found desirable to use distilled water so that the water which is intermittently sprayed on the articles being tested, may not cause mineral deposits to collect on the articles, and additionally, will not cause mineral deposits to collect on the surface of the mirrors of the apparatus when the spray progressively falls on the mirrors.

Accordingly, it will be appreciated that the prior art discloses apparatus, wherein efficient operation thereof is dependent upon the use of distilled water which does not cause the collection of minerals on the articles being tested, and also prevents the collection of minerals on the solar reflective mirrors of the apparatus.

It will be appreciated by those skilled in the art that the cost of distilled water is substantial with relation to the operation of hundreds of such machines for the testing of a great variety of materials.

Prior art apparatus has been equipped with a plurality of stationary nozzles generally directed at the surface area of the materials being tested. In order to feed spray through the nozzles a substantial pressure must be applied so that the nozzles will sufficiently atomize the distilled water to attain a fine spray thereof on the surfaces of the materials being tested in the target area of the apparatus or machine. Accordingly, considerable amounts of distilled water have been used by a plurality of these nozzles spaced in sufficiently close relation to each other to adequately cover an elongated surface or radiation target area on which the materials are tested.

From the foregoing it will be appreciated that prior art testing methods have been satisfactory with respect to the testing results, however, it will be understood that considerable amounts of distilled water have been used in order to accomplish the desired results, and principally due to the fact that a plurality of nozzles in closely spaced relationship have been utilized along the elongated materials support area of the apparatus in order fully to cover the entire area.

SUMMARY OF THE INVENTION

The present invention comprises a machine for solar radiation testing of materials, and more particularly, to such a machine employing a pivoted nozzle means which provides for the oscillation of a spray nozzle axis so that the spray which is emitted from the nozzles may be swept longitudinally of a substantial portion of the target area of the testing machine of the invention in order to minimize the number of nozzles being used to minimize the amount of distilled water needed for efficient testing operations. The present invention employs a very simple motorized crank system having linkage connected to a crank; in and also pivoted to a pivoted nozzle means so that the nozzles are pivoted on a pivotal axis at substantially right angles to the longitudinal axis of an elongated materials testing surface or radiation target area so that when the nozzle means is pivoted in an oscillatory fashion, the spray jet axis sweeps a longitudinal pass along the longitudinal axis of the elongated target area, and thus each individual spray nozzle may cover a relatively great distance along the elongated target area, and thus alleviate the necessity of having a greater number of closely spaced nozzles along said area. In this manner, small jet orifice nozzles may be used and a nominal number of such nozzles thus utilizes a relatively small amount of distilled water in a given length of time during which the surfaces of the samples of materials being tested are fully wetted, as would be the case where under any conditions, the samples being tested only require a surface film of water thereon.

Accordingly, it is an object of the invention to provide an improved water spray means for wetting samples being tested in a solar radiation testing machine.

Another object of the invention is to provide an improved water spray nozzle means for solar radiation testing machines which are particularly adapted for use in saving substantial amounts of distilled water.

Another object of the invention is to provide an improved machine for solar radiation testing materials, wherein very simple, reliable and efficient oscillating spray nozzles are utilized for the purpose of intermittently wetting samples of materials being tested in said machine.

Further objects and advantages of the invention may be apparent from the following specification, appended claims, and accompanying drawings.

BRIEF DESCRIPTION OF THE DRAWINGS

FIG. 1 is a perspective view of a machine for solar radiation testing of material comprising a novel oscillatory spray nozzle means of the invention operably connected therewith;

FIG. 2 is an enlarged fragmentary perspective view of oscillating spray nozzle means of the invention; and FIG. 3 is an enlarged fragmentary sectional view taken from the line 3—3 of FIG. 2, showing details of the pivoted oscillating spray nozzle means of the invention.

DESCRIPTION OF THE PREFERRED EMBODIMENTS

As shown in FIG. 1 of the drawings, the invention comprises a base frame 10 and a movable frame 12 pivoted thereon about the axis of a drive shaft 14.

The basic machine of the invention is similar to that shown in Pat. 2,945,417 hereinbefore referred to. This machine employs a plurality of mirrors 16 on one side of the movable frame 12, and another plurality 18 of reflective mirrors on the opposite, both of which convergingly reflect the rays of the sun onto an elongated target area 20 on which materials being tested are secured. A blower 22 communicates with a duct 24 to supply cooling air to the sample of material 20, and this blower and duct structure is similar to that disclosed in said patent hereinbefore referred to.

The principal improvement of the present invention comprises a water spray nozzle means comprising oscillatory spray nozzles which are more actuated and adapted to oscillate in a direction longitudinally of the elongated target area 20, such that each pivoted nozzle projects a jet spray which covers a considerable area longitudinally along the elongated target area 20, and to thereby save expensive distilled water.

As shown in FIG. 1, a pair of pivoted spray nozzles 26 are directed toward the elongated target area 20, and these pivoted spray nozzles 26 are shown in detail in FIGS. 2 and 3 of the drawings. Each nozzle 26 is provided with a jet orifice 28 having a jet axis 30 directed generally toward the target area 20 and adapted to oscillate about a pivotal axis generally at an angle thereto, said pivotal axis being provided by a pivot pin 32 about which each nozzle 26 is pivotally mounted. This pivot pin is carried in a clevis 34, all as shown best in FIGS. 2 and 3 of the drawings.

The pivot pin 32, as shown in FIG. 3 of the drawings, is provided with a hollow central portion 35 communicating with the interior of each nozzle 26. The hollow portion 35 communicates with a hollow trunnion portion 36 which is integral with the pivot pin 32. This hollow trunnion portion 36 extends through a pivot bearing 38 carried by the clevis 34 and projects beyond the outer side thereof.

Secured on the exterior of the hollow trunnion portion 36 is a flexible conduit 40. This conduit 40 is sealingly clamped on the hollow trunnion 36 by means of a clamp 42.

The flexible conduit 40 communicates through a conventional pipe fitting 44 with a water supply manifold 46 intermittently fed water by a suitable control valve which is no part of the present invention.

Secured to the pivot pin 32 and extending normally upward therefrom is an actuating arm 48 having a pivot bolt 50 secured thereto.

A link 52 is pivotally connected on each bolt 50 in connection with each arm 48 coupled to each nozzle 26.

The link 52 is provided with a bearing 53 pivotally mounted on a crank pin 54 driven by a shaft 56 of a motor 58 mounted on an upstanding portion 60 of the frame 12.

As the motor shaft 56 rotates, the crank pin 54 is rotated about an arcuate path which causes the reciprocation or oscillatory movement of the link 52, and the arms 48 pivotally connected therewith. Thus, the nozzles 26 are pivoted about the axes of the pivot pins 32 in an oscillatory fashion, such that the jet delivery ends of the nozzles 28 move about an arcuate path generally indicated by arrows at 62 in FIG. 2 of the drawings.

It will be seen that the jet axis 30 of each nozzle 26 may be oscillated back and forth between positions A and B, as shown in FIG. 2 of the drawings, so that each nozzle 26 may effectively spray a substantial portion of the elongated target area 20 of the machine, shown in FIG. 1, and in this manner, a minimum number of spray nozzles may be required with a given fluid pressure efficiently to wet samples of materials on the elongated target area 20. Due to the small number of nozzles, the entire elongated target area may efficiently be wetted with a minimum amount of expensive distilled water.

It will be understood by those skilled in the art that the use of distilled water is necessary in order to prevent accumulation of mineral deposits on the samples being tested, and also to simulate the wetting by rain, and further to avoid accumulation of minerals on the mirrors 16 and 18 when some of the spray collects or is blown onto these mirrors.

A timer operated valve, not shown and which is no part of the present invention, is used intermittently to supply distilled water, under pressure, to the interior of the manifold 44 and through the flexible conduit 40 and into the interior of each spray nozzle 26, as hereinbefore described.

During oscillatory movement of each nozzle 26, the respective flexible conduit 40 undergoes tortional deflection with each back and forth oscillatory movement. Each flexible conduit 40 may be made of suitable plastic material which will certainly withstand the tortional deflection involved in the oscillatory movement of the spray nozzles 26.

It will be appreciated by those skilled in the art that the oscillatory spray nozzle mechanism of the present invention may save a substantial amount of distilled water especially when a great number of the machines, as shown in FIG. 1, may be operated each day for the purpose of testing a great variety of materials at a test facility.

It will be obvious to those skilled in the art that various modifications of the present invention may be resorted to in a manner limited only by a just interpretation of the following claims.

I claim:

1. In a machine for solar radiation testing of materials, the combination of: a base frame; a movable frame pivoted on said base frame about a pivotal axis disposed at an angle to the rays of sunshine, and disposed to permit said movable frame to be constantly adjusted about said axis so as to maintain a substantially constant angular relation to said rays; mirror means supported on said movable frame; a material holding target means carried by said movable frame in spaced relation to said mirror means; said mirror means disposed to reflect said rays of sunshine onto said target means; a spray nozzle pivoted on said movable frame and having a jet axis directed generally at said target means; said target means being an elongated area; the pivotal axis of said spray nozzle being at an angle to the longitudinal axis of said elongated area so as to cause said jet axis of said nozzle to be actuated such that spray therefrom sweeps in a longitudinal direction with relation to said target means when said nozzle is pivoted about said pivotal axis; and motorized means disposed to pivotally oscillate said nozzle about its pivotal axis.

2. The invention, as defined in claim 1, wherein: said motorized means comprises a link pivoted to said spray nozzle; a crank pivotally coupled to said link; and a motor disposed to rotate said crank.

3. In a machine for solar radiation testing of materials, the combination of: a base frame; a movable frame pivoted on said base frame about a pivotal axis disposed at an angle to the rays of sunshine and disposed to permit said movable frame to be constantly adjusted about said axis so as to maintain a substantially constant angular relation to said rays; mirror means supported on said movable frame; a materials holding target means carried by said movable frame in spaced relation to said mirror means, said mirror means disposed to reflect said rays of sunshine onto said target means; a plurality of spray nozzles pivoted on said movable frame and each having a jet axis directed generally at said target means; said target means being an elongated area; the pivotal axes of said spray nozzles being at an angle to the longitudinal axis of said elongated area so as to cause said jet axes of said nozzles to be actuated, such that spray therefrom sweeps in a longitudinal direction with relation to said target means, when said nozzles are pivoted about said pivotal axes; and motorized means disposed to pivotally oscillate said nozzles about their pivotal axes.

4. The invention, as defined in claim 3, wherein: said motorized means comprises a link pivoted to said spray nozzles; a crank pivotally coupled to said link; and a motor disposed to rotate said crank.

References Cited

UNITED STATES PATENTS 2,945,417   7/1960   Caryl et al.

RONALD L. WIBERT, Primary Examiner

O. B. CHEW II, Assistant Examiner

U.S. Cl. X.R.

126—270